United States Patent [19]

Shiraya et al.

[11] Patent Number: 4,909,198
[45] Date of Patent: Mar. 20, 1990

[54] ALUMINUM ALLOY VALVE LIFTER WITH SPRAYED COATING AND METHOD OF PRODUCING SAME

[75] Inventors: Shigeki Shiraya; Takesi Nakakobara, both of Toyota; Hitoshi Ishii, Chita; Takashi Tomoda, Nagoya; Kenji Shimoda, Toyota; Souichi Hayashi, Nagoya; Zenichiro Kato, Mishima; Syuichi Ezaki, Susono, all of Japan

[73] Assignee: Toyota Jidosha Kabushiki Kaisha, Toyota, Japan

[21] Appl. No.: 316,639

[22] Filed: Feb. 28, 1989

[30] Foreign Application Priority Data

| Mar. 1, 1988 | [JP] | Japan | 63-45909 |
| Mar. 3, 1988 | [JP] | Japan | 63-48705 |
| Jul. 18, 1988 | [JP] | Japan | 63-176971 |
| Jul. 23, 1988 | [JP] | Japan | 63-182827 |
| Jul. 30, 1988 | [JP] | Japan | 63-189587 |

[51] Int. Cl.$^4$ .................................................. F01L 1/14
[52] U.S. Cl. .............................. 123/90.51; 123/90.48
[58] Field of Search ........... 123/90.48, 90.51, 188 AA

[56] References Cited

U.S. PATENT DOCUMENTS

| 3,545,415 | 12/1970 | Mori | 123/90.51 |
| 3,628,514 | 12/1971 | Phillips | 123/90.51 |
| 4,182,299 | 1/1980 | Earle et al. | 123/188 AA |
| 4,230,491 | 10/1980 | Behnke | 123/90.51 |
| 4,430,970 | 2/1984 | Holtzberg et al. | 123/90.51 |

FOREIGN PATENT DOCUMENTS

| 47-50885 | 12/1972 | Japan . | |
| 53-6238 | 1/1978 | Japan . | |
| 53-34635 | 3/1978 | Japan . | |
| 53-42148 | 4/1978 | Japan . | |
| 57-34346 | 7/1982 | Japan . | |
| 58-165508 | 9/1983 | Japan . | |
| 0176409 | 10/1983 | Japan | 123/90.51 |
| 58-214609 | 12/1983 | Japan . | |
| 62-63105 | 3/1987 | Japan . | |

OTHER PUBLICATIONS 85-15251 11/20/85, Journal of Technical Disclosure.

*Primary Examiner*—Willis R. Wolfe
*Assistant Examiner*—Weilun Lo
*Attorney, Agent, or Firm*—Finnegan, Henderson, Farabow, Garrett and Dunner

[57] ABSTRACT

An aluminum alloy valve lifter comprises a valve lifter body made of Al-Si (5-20%) type alloy, having silicon average grain diameter of 2 to 40 micrometers, and consisting of a cylindrical portion and a disc portion; an Fe-C type sprayed coating formed on the peripheral surface of the cylindrical portion, containing 0.1% or more of carbon and having a hardness of 300 Hv or more; a wear-resistant chip fixed on the underside of the disc portion; and an adjusting shim set on the upper side of the disc portion.

4 Claims, 10 Drawing Sheets (× 400)

(× 400)

(X 200)

(X 200)

ALUMINUM ALLOY VALVE LIFTER WITH SPRAYED COATING AND METHOD OF PRODUCING SAME

BACKGROUND OF THE INVENTION

1. Field of the Invention

The present invention relates to a valve lifter coming into contact with a cam for operating a valve of an engine, and more particularly, to an aluminum alloy valve lifter and a method of producing the same.

2. Description of the Related Art

Valve lifters used in an engine of an automobile or the like are usually made of a light alloy, such as an aluminum alloy, instead of steel, to reduce weight and improve the fuel consumption efficiency (see, for example, Japanese Examined Patent Publication (JP-B) No. 47-50885). Use of the aluminum alloy valve lifter, however, causes problems with the wear resistance of the lifter when in contact with a cam for operating a valve, an end of a valve rod (stem), and an inside surface of a guide hole therefor formed in an aluminum cylinder head. Various proposals have been made for light metal (aluminum alloy) valve lifters having a cylindrical portion and a disc portion formed within a cylindrical portion. For example, as disclosed in Japanese Unexamined Patent Publication (JP-A) No. 58-165508, a wear-resistant metal part coming into contact with the cam and the valve rod is inserted in an cast aluminum alloy valve lifter; and a peripheral surface thereof is plated with Fe-P. In this case, the wear-resistant metal part serves as an inner shim, and as an adjusting shim, but this makes it impossible to replace the adjusting shim only, and thus makes it difficult to carry out maintenance of the valve lifter. In the valve lifter disclosed in Japanese Unexamined Patent Publication (JP-A) No. 58-165508, a projecting part of a wear-resistant material is inserted in a cast aluminum alloy lifter body inside the disc portion of the body, and a removable adjusting shim is lifted to the disc portion. In this case, however, the top surface of the disc portion of the valve lifter body does not have sufficient wear-resistance to carry the adjusting shim, and the wear-resistance of the peripheral surface of the lifter body sliding in a guide hole of a cylinder head, also is insufficient.

A valve lifter disclosed in Japanese Unexamined Patent Publication (JP-A) No. 58-214609 is formed of a light alloy casting (e.g., aluminum alloy casting). A top surface for contact with a cam, a back surface for contact with a valve rod and a disc portion of the valve lifter are coated with a hard material by thermal spraying. However, it is difficult to accurately form the sprayed coating of a hard material on the back surface of the disc portion of the valve lifter, and the peripheral surface of the lifter sliding in the guide hole still does not have a sufficient wear resistance.

In an aluminum alloy valve lifter disclosed in Japanese Examined Patent Publication (JP-B) No. 47-50885 a filler for contact with the cam is sprayed into a recess; in a disc portion, the recess has a profile such that the filler will not separate therefrom. To form a reverse tapered portion of the recess prior to the thermal spraying, however, a complicated cutting process must be carried out on the disc portion, and it is difficult to apply a desired sprayed coating onto the reverse tapered portion. Furthermore, wear resistance of the peripheral surface of the valve lifter sliding in the guide hole is still insufficient.

According to JIII (Japan Institute of Invention and Innovation) Journal of Technical Disclosure No. 85-15251, a valve lifter body can be made of titanium and the entire surface thereof subjected to a nitriding process to increase the durability thereof, but the use of titanium greatly increases the costs.

In a well known surface treatment of a sliding part of a light alloy such as aluminum alloy, a wear-resistant sprayed coating (layer) is formed on the sliding part by thermally spraying a coating of a ferrous metal thereon by an electric arc spraying or plasma spraying process. The plasma spraying process is disclosed, for example, in Japanese Unexamined Patent Publication (JP-A) No. 53-6238 and 53-42148 and Japanese Examined Patent Publication (JP-B) No. 57-34346. When the thermal spraying process is used to apply a surface treatment of a peripheral surface of an aluminum alloy valve lifter, a sprayed coating having a good wear resistance can be formed uniformly over the entire peripheral surface.

In the plasma spraying process, an electric arc is generated between a cathode and a copper nozzle anode, and a working gas (Ar, $Ar+H_2$ or $Ar+N_2$) is made to flow spirally through the nozzle and is heated by the arc, so that a plasma jet having a high temperature and a high speed is spouted from the nozzle. The material (powder) to be sprayed is fed into the plasma jet, melted, and impinged on a workpiece surface to form a sprayed coating thereon. In the electric arc spraying process, two wires formed of the material to be sprayed are fed continuously. An electric arc is generated between the ends of the two wires and the wires are melted by the arc. The melt is formed into molten particles by an air jet spout blown from behind, and the molten particles are impinged on a workpiece surface to form a sprayed coating thereon.

The sprayed coating formed by the arc spraying process has a greater porosity than that of the sprayed coating formed by the plasma spraying process. This is because the molten particles obtained from the wires in the arc spraying process are larger than the particles obtained from the powder in the plasma spraying process, and the speed of travel of the molten particles in the arc spraying process is slower than that of the particles in the plasma spraying process. Therefore, particles adhering to the workpiece surface in the arc spraying process are not crushed to the degree occurring in the plasma spraying process, and thus pores between the particles adhering in the arc spraying process are larger than those of the plasma spraying process. Where the porosity is great (i.e., a large number of pores exist), the wear resistance and peeling resistance of the sprayed coating are lowered. The above also applies to the formation of an Fe-C type sprayed coating on a peripheral surface of an aluminum valve lifter, by the arc spraying process. In this connection, if the hardness of the sprayed coating is too low, the wear resistance thereof is lowered. Conversely, if the hardness of the sprayed coating is too high, the coating causes a high degree of wear of the surfaces with which it is in contact, for example, the surface of a guide hole.

When the aluminum alloy valve lifter is used, wear of the upper portion, including the top end and the lower portion, and including the bottom end of the valve lifter, is greater than that of the center portion, due to sliding kinetic behavior. Namely, wear caused by the sliding contact of the peripheral surface of the valve lifter and the inner surface of the guide hole appears on the upper and lower portions having a width of from 5 to 7 mm from the top and bottom end, respectively, of the peripheral surface, but does not appear at the center portion thereof. Nevertheless, disregarding the above wear phenomena, the sprayed coating on the peripheral surface is generally uniform.

Furthermore, the ferrous metal sprayed coating formed on the peripheral surface of the aluminum alloy valve lifter is ground by a centerless grinder, to finish the valve lifter to the required dimensions and to prevent the sprayed coating from causing wear of the inner surface of the guide hole. In the centerless grinding, a water-soluble oil (grinding fluid) is used to prevent an undue load on the grinding wheel; and if the valve lifter is ground after the coating treatment, and water-soluble oil adheres to, and penetrates the ferrous metal sprayed coating and generates rust (or corrosion), which causes wear of both the sprayed coating and the inner surface of the guide hole. Therefore, after the grinding step the ground surface of the lifter is coated with a rust-preventing oil or the like by dipping or spraying.

Nevertheless of although coated with a rust-preventing oil, water held in pores of the sprayed coating cannot be completely removed and thus rust may be generated during a long period of storage in atmospheric conditions before installation thereof into an engine.

SUMMARY OF THE INVENTION

A first object of the present invention is to provide aluminum alloy valve lifter able to be easily maintained, having an increased wear resistance, and at a lower cost.

A second object of the present invention is to provide an Fe-C type sprayed coating formed on a peripheral surface of the aluminum alloy valve lifter by an electric arc spraying process, and having suitable sliding properties.

A third object of the present invention is to increase the wear resistance of the aluminum alloy valve lifter by spraying an Fe-C type coating on upper and lower portions of the lifter, and by spraying an Fe-C type coating holding a lubricant on a center portion of the lifter.

A fourth object of the present invention is to provide a method of producing an aluminum alloy valve lifter having an Fe-C type coating sprayed thereon, which method omits a useless center portion of the sprayed coating and thus reduces production costs.

A fifth object of the present invention is to provide a method of producing an aluminum alloy valve lifter having an Fe-C type coating sprayed thereon, which method avoids the generation of rust due to water retained pores of the sprayed coating during a grinding step.

The first object of the present invention is obtained by providing an aluminum alloy valve lifter having a coating sprayed thereon and which comprises: a valve lifter body of an aluminum alloy consisting essentially of 5 to 20% of a Silicon, additive element, for increasing a strength thereof, and aluminum and inevitable impurities, and containing silicon particles having an average grain diameter of from 2 to 40 micrometers in the matrix thereof; an Fe-C type sprayed coating formed on a sliding peripheral surface of the valve lifter body and having a carbon content of 0.1% or more, and a hardness of 300 Hv or more; a wear-resistant chip fixed on a portion of the valve lifter body, to be in contact with a valve rod; and an adjusting shim set on another portion of the valve lifter body, to be in contact with a cam.

The aluminum alloy is one of the Al-Si series containing a relatively large content of silicon (Si) and having a good cold-forgeability. Preferably, the alloy is formed into a valve lifter body composed of a disc portion and a cylindrical portion by a cold-forging process. The aluminum alloy has sufficient wear-resistance to withstand contact of the top surface of the disc portion of the valve lifter body with the adjusting shim, and thus it is unnecessary to perform a surface-treatment or to form a sprayed coating on the contacting top surface. If the silicon content of the aluminum alloy is less than 5% by weight, the wear resistance of the alloy is low, and if the silicon content is more than 20% by weight, the silicon particles are too large and cause a remarkable lowering of the material characteristics and cold forgeability. Since an aluminum alloy containing silicon alone has poor mechanical properties, a suitable content of additive elements, such as Mg, Cu, and Ni should be added to the Al-Si alloy, to improve these mechanical properties. In particular, a precipitation hardening of Cu and/or Mg gives a high strength. A high content of silicon generates primary crystals and/or eutectic crystals of silicon in the matrix, and these crystals have a high hardness to increase the wear resistance. Where an average grain diameter of the silicon crystals is less than 2 micrometers, the wear resistance is poor and where the average grain diameter is more than 40 micrometers, the material characteristics such as fatigue strength are lowered.

When an aluminum alloy valve lifter reciprocates in a guide hole formed in an aluminum alloy cylinder (i.e., a peripheral surface of the lifter slides on the hole surface), the problem of wear caused by adhesion between the aluminum alloy parts arises, but this problem can be solved by spraying an Fe-C type coating on the peripheral surface of the lifter. If the carbon content of the Fe-C type sprayed coating is less than 0.1% or the hardness of the coating is less than 300 Hv, the wear resistance of the coating is lowered.

Since an end of a valve rod (stem) impinges on the valve lifter and causes wear thereof, a wear-resistant chip made of a hard material, such as carbon steel, stainless steel, and ceramic is fixed on an inside surface of a disc portion of the valve lifter body at the point of impingement.

Furthermore, since a cam of a camshaft comes into contact with the valve lifter and exerts a large load thereon, an adjusting shim made of a hard metal, such as carbon steel and stainless steel, is set on an outside surface of the disc portion of the valve lifter body. The adjusting shim can be replaced with another adjusting shim, when a valve clearance is to be adjusted.

The second object of the present invention is obtained by providing an Fe-C type sprayed coating formed by an electric arc spraying process and having a porosity of 5% or less, each of the particles of the sprayed coating having a degree of crush upon adhesion (adhesion length a − adhesion height b/adhesion length a) of 0.95 or more. Preferably, in the arc spraying process, an air blow pressure of from 5.6 to 11.2 kgf/cm$^2$ (from 80 to 160 psi) is used, to ensure that the prescribed porosity and degree of crush is obtained.

The third object of the present invention is obtained by providing an Fe-C type sprayed coating consisting of an upper portion and a lower portion having a hardness of from 350 to 450 Hv, and a center portion having a porosity of from 5 to 10%.

In this case, the upper and lower portions of the aluminum alloy valve lifter requiring wear resistance are covered with the Fe-C type sprayed coating having a hardness of from 350 to 450 Hv, which has a suitable wear resistance but will not cause a high degree of wear of an inner surface of a guide hole. The center portion of the lifter is covered with the Fe-C type sprayed coating having a porosity sufficient to allow a lubricant oil to be held in pores of the coating. Where the porosity is less than 5%, the infiltration of the lubricant in the pores is insufficient, and where the porosity is more than 10%, the sprayed coating is easily locally peeled off during a peripheral surface grinding process.

The fourth object of the present invention is obtained by providing a method of producing an aluminum alloy valve lifter having a coating sprayed thereon, comprising the step of: (a) preparing a plurality of aluminum alloy valve lifter bodies each having two tapered portions at an upper end and lower end thereof; (b) piling the plurality of valve lifter bodies one of top of the other while inserting spacer plates between each adjacent valve lifter body; (c) spraying a coating onto the tapered portions of the adjacent valve lifter bodies and the intervened spacer plate in such a manner that the center of the coating spray is positioned at the lifter portion in contact with the spacer plate; (d) separating the valve lifter bodies individually at the portions where the lifter bodies are in contact with the spacer plates; and (e) machining the peripheral surface of each of the valve lifter bodies having the coating sprayed thereon.

The fifth object of the present invention is obtained by providing a method of producing an aluminum alloy valve filter having a coating sprayed thereon, comprising the steps of: (f) spraying an Fe-C type coating on a peripheral surface of an aluminum alloy valve lifter body; (g) grinding the peripheral surface of the valve lifter body having the coating sprayed thereon, while using a water-soluble oil; (h) removing water contained in pores of the sprayed coating by rotating the valve lifter body at a high speed, or by heating the valve lifter body to a temperature of from 80° to 150° C. in a vacuum condition; and (i) immediately after the water removing step (h) is completed, applying oil to the valve lifter body.

Since the water contained in the pores is to be blown off by centrifugal force generated by a high speed rotation of the lifter body, a rotation speed of 500 rpm or more is preferable. A rotation speed of less than 500 rpm may not provide a satisfactory removal of the water.

The high speed rotation causes a negative internal pressure to form temporarily in the pores, and thus, if the oil is applied immediately on the valve lifter body, the oil will easily infiltrate the pores. The heating vaporizes any water remaining in the pores, and the vacuum accelerates the vaporization. A heating temperature of less than 80° C. is not sufficient to cause the water vaporization, and a heating temperature of more than 150° C. has an adverse affect on the aluminum alloy base. The lower the vacuum pressure, the greater the effect thereof, and preferably, the vacuum pressure is from $10^{-3}$ to $10^{-2}$ Torr. If the oil is applied to the valve lifter body immediately after heating in vacuum, the oil will easily infiltrate the pores. The oil is applied by spraying or dipping in an oil bath. Preferably the oil is a rust-preventive oil or an engine oil. Furthermore, preferably graphite is mixed in the oil, to serve as an additional lubricant.

It is possible to remove the water by a combination of a high speed rotation and vacuum heating. In this case, the heating time becomes shorter and the water is completely removed.

BRIEF DESCRIPTION OF THE DRAWINGS

The present invention will be more apparent from the description of the preferred embodiments set forth below, with reference to the accompanying drawings, in which.

DESCRIPTION OF THE PREFERRED EMBODIMENTS

Embodiment 1

The first embodiment of the present invention is now explained in detail by an example of the present invention and experiments by the inventors, with reference to FIGS. 1 to 5.

EXAMPLE

Figure 1:
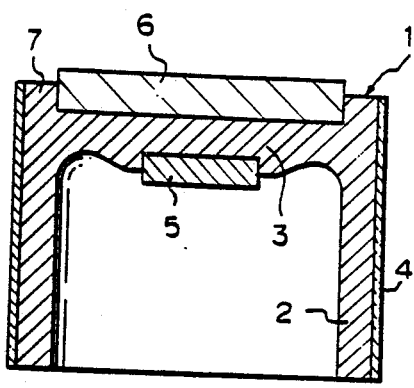
FIG. 1 is a schematic sectional view of an aluminum alloy valve lifter according to the present invention.

As shown in FIG. 1, an aluminum alloy valve lifter according to the present invention is composed of a valve lifter body 1 made of Al-Si type alloy and consisting of a cylindrical portion 2 and a disc portion 3, an Fe-C type coating 4 sprayed on the peripheral surface of the cylindrical portion 2, a wear-resistant chip 5 fixed to the underside of the disc portion 3, and an adjusting shim 6 set on the upper surface of the disc portion 3. An end of a valve rod (not shown) impinges on the wear-resistant chip 5, and a cam (not shown) comes into contact with the adjusting shim 6. The portion 2 has a ring ridge part 7 surrounding the shim 6.

The aluminum alloy valve lifter according to the present invention is produced, for example, in the following manner.

The valve lifter body 1 is formed from an Al-Si type alloy (for example, 11.6% Si, 4.1% Cu, 0.8% Mg, and the rest Al and inevitable impurities) by cold forging, heat-treated and machined to predetermined dimensions. The wear-resistant chip 5 of hardened carbon steel is fixed to the underside of the disc portion 3 by locally deforming the disc portion 3 around the chip 5. Then, the Fe-C type (Fe-0.8% C) coating 4 having a thickness of from 100 to 200 μm is formed by thermal spraying on the peripheral surface of the cylindrical portion 4. The sprayed coating 4 is ground to predetermined dimensions by a centerless grinder. Finally, the adjusting shim 6, which is separately fabricated, is set on the upper surface of the disc portion 3, and thus the required valve lifter is obtained.

EXPERIMENT A

Valve lifter bodies were formed from aluminum alloy having the following compositions, by cold forging, heat-treated under the following conditions, and machined to predetermined dimensions.
A: Composition of the aluminum alloys (wt %):
Si: 0, 3, 5, 12, 18 or 37
Cu: 4 (constant)
Mg: 0.8 (constant)
Impurities (Mn, Fe, Cr, Zr, Ti): Constant
  Al: The rest
B: Heat-treatment conditions:
  500° C. for 1 hour—Water quenching
  −180° C. for 6 hours The wear-resistant chips were fixed and the adjusting shims were set on the valve lifter bodies, respectively, before the Fe-C type coating was sprayed on the peripheral surfaces of the valve lifter bodies. The produced valve lifters were installed in an engine and were reciprocated in guide holes of an aluminum alloy cylinder head of the engine, under engine a running condition of a speed of rotation of 6000 rpm, for 180 hours.

Figure 2:
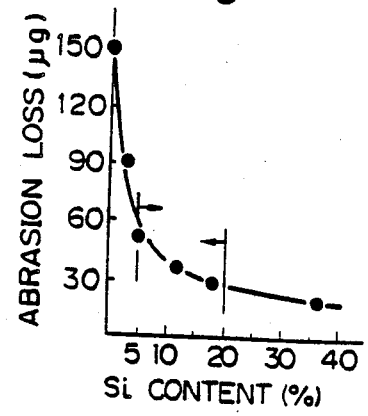
FIG. 2 is a graph showing a relationship between the silicon (Si) content and abrasion loss of the aluminum alloy valve lifter body.
Figure 3A:
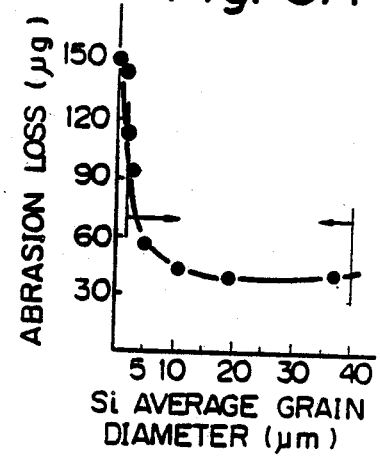
FIG. 3A is a graph showing a relationship between the silicon average grain diameter and abrasion loss of the lifter body.
Figure 3B:
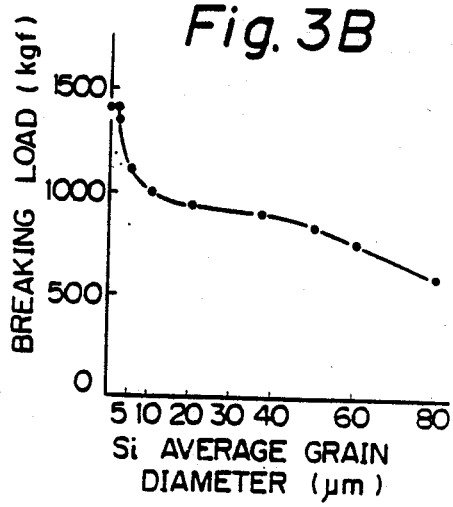
FIG. 3B is a graph showing a relationship between the silicon average grain diameter and breaking load of a ring ridge part of the valve lifter body.

After this durability test, the abrasion losses of the peripheral surface of the cylindrical portions of the valve lifters were measured, respectively. The relationships between the measurement results and silicon content or average grain diameter of silicon crystals (grains) in the matrix of the Al-Si type alloys are shown in FIGS. 2 and 3A. As seen from FIG. 2, the lower the silicon content, the greater the abrasion loss. Where the silicon content is less than 5%, the abrasion loss is remarkably increased. The upper limit (20%) of the silicon content is set because the coarsening of the silicon grains remarkably impairs the elongation and fatigue strength of the material. Observation of the structure of the valve lifter body with a microscope showed that, basically, the larger the silicon content, the larger the silicon grain diameter. As seen from FIG. 3A, when the silicon average grain diameter is less than 2 μm the abrasion loss is further increased, but when the silicon average grain diameter is more than 40 μm, the abrasion loss is not substantially changed.

Furthermore, on a ring ridge part 7 of each of the formed valve lifter bodies 1, a static load was applied outwardly (in a crosswise direction) by a universal testing machine to break the portion 7. A relationship between the breaking load (force) and silicon average grain diameter of the lifter bodies are investigated to obtain FIG. 3B. As seen from FIG. 3B, the larger the Si average grain diameter, the lower the breaking load. When the Si average grain diameter is more than 40 μm, the breaking load is further lowered. In practice, when a load of the cam is applied on the adjusting shim 6 surrounded by the ring ridge part 7 (FIG. 1), a portion of the load is applied on the part 7. When an engine runs at a high speed, the load on the ridge part 7 is increased. Since the ridge part 7 should withstand the load of 1000 kgf of a design specification, the average Si grain diameter of from 2 to 10 μm is preferable.

EXPERIMENT B

Valve lifter bodies were formed from an aluminum alloy (11.6% Si, 4.1% Cu, 0.8% Mg, and the rest Al and inevitable impurities), by cold forging, heat-treating and machining in the same manner as in experiment A. Then, Fe-C type coatings having different carbon contents (0.01, 0.07, 0.11, 0.2 or 0.3%) and having a thickness of 50 μm were sprayed by electric arc spraying onto the valve lifter bodies, respectively. Next the wear-resistant chips were fixed to and the adjusting shims were set on the valve lifter bodies, to produce the required valve lifters, and these valve lifters were installed in an engine. The durability test (wear test) of the Fe-C type sprayed coatings was performed under the same conditions as in experiment A.

Figure 4:
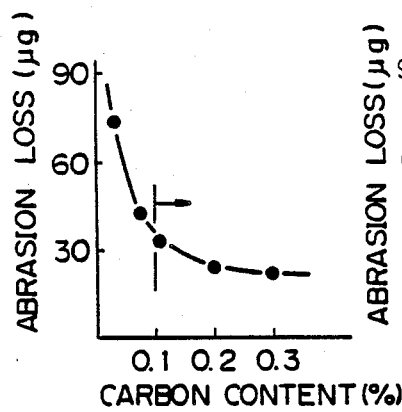
FIG. 4 is a graph showing a relationship between the carbon content and abrasion loss of an Fe-C type sprayed coating.
Figure 5:
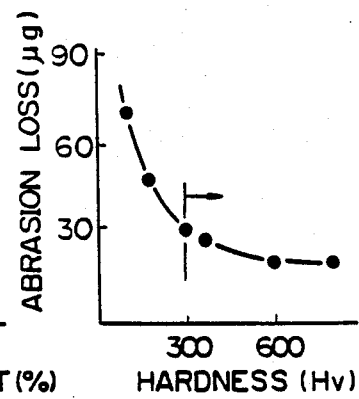
FIG. 5 is a graph showing a relationship between the hardness and abrasion loss of the sprayed coating.

After the test, the abrasion losses of the Fe-C type sprayed coatings were measured, respectively, and the hardness of the sprayed coatings was measured with a Vickers hardness tester. The relationships between the measurement results and carbon content or sprayed coating hardness are shown in FIGS. 4 and 5. As seen from FIG. 4, the larger the carbon content, the lower the abrasion loss. Where the carbon content is less than 0.1%, the abrasion loss if further increased. As seen from FIG. 5, an increase of the hardness reduces the abrasion loss, but the abrasion loss is increased at a hardness of less than 300 Hv.

According to the present invention, a valve lifter is simply and easily formed by cold-forging aluminum containing silicon which has a wear-resistance sufficient to allow an adjusting shim to be set thereon. The use of the removable adjusting shim is convenient for maintenance. The Fe-C type coating sprayed on the peripheral surface of the valve lifter provides sufficient wear resistance to the lifter sliding in the guide hole of an aluminum alloy cylinder head.

EMBODIMENT 2

The second embodiment of the present invention will be further described in detail by electric arc spraying experiments, an example of the present invention, and comparative examples, with reference to FIGS. 6 to 14.

EXPERIMENT A (Relationships Between Blow Pressure, and Sprayed Coating Porosity and Degree of Crush of Sprayed Particles, and Relationship Between Sprayed Coating Hardness and Degree of Crush)

Figure 6:
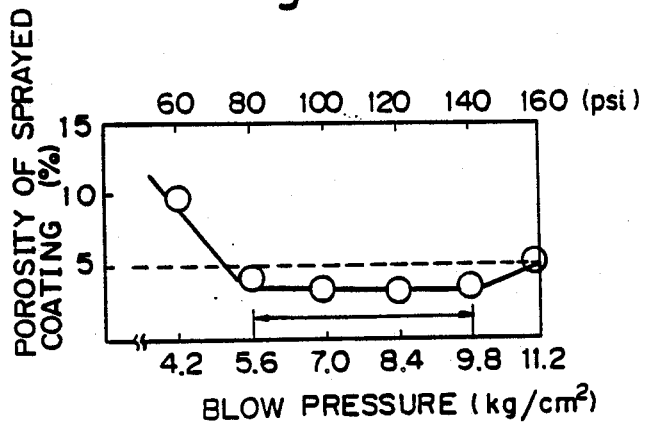
FIG. 6 is a graph showing a relationship between the blow pressure in an electric arc spraying process and the porosity of a sprayed coating.

A block (test piece for LFE wear test) of an aluminum alloy was prepared and shot-blasted, and electric arc spraying was carried out under the following conditions to spray coatings on the shot-blasted surfaces.
Blow pressure (of air): 4.2 to 11.2 kgf/cm$^2$(60 to 160 psi)
Wire of sprayed material: Fe-0.8% C
Spraying current: 200 A
Spraying voltage: 30 V
Spraying distance: 150 mm The relationship between the blow pressure and sprayed coating porosity is shown in FIG. 6. As seen from FIG. 6, preferably the blow pressure of air is from 5.6 to 9.8 kgf/cm$^2$ (from 80 to 140 psi), to minimize the porosity. Note, a blow pressure of from 5.6 to 11.2 kgf/cm$^2$ gives a porosity of 5% or less. In a conventional electric arc spraying, a blow pressure of 4.2 kgf/cm$^2$ (60 psi) has been recommended and adopted, whereby the porosity is about 10%, which is a relatively large. In this case, the sprayed coating has a large roughness, inferior wear resistance, inferior peeling resistance, and a relatively large portion removed during grinding (centerless grinding). These disadvantages are due to an increased porosity (spaces between adhered particles) in the sprayed coating. The increased porosity occurs because a low blow pressure does not sufficiently crush the molten (spray) particles. On the other hand, a blow pressure of more than 11.2 kgf/cm$^2$ increases the bouncing or splashing of the molten particles, and thus lowers the coating yield.

Figure 7:
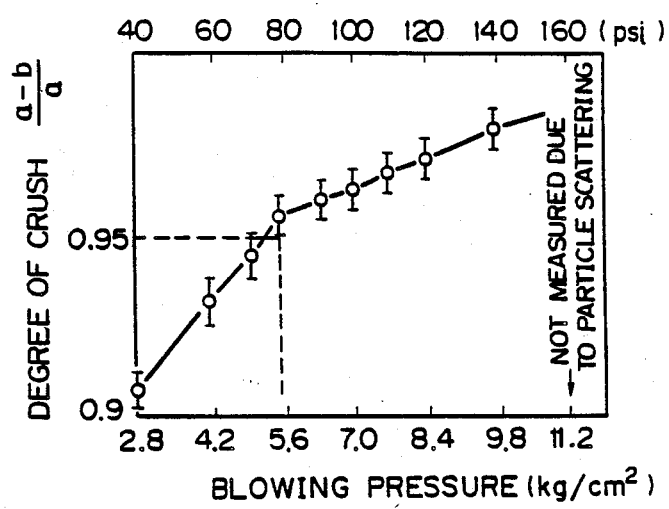
FIG. 7 is a graph showing a relationship between the blow pressure and the degree of crush of spray particles.
Figures 8A, 8B, 8C:
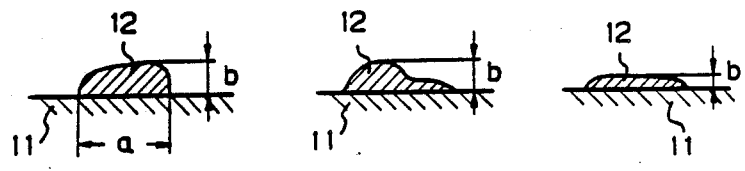
FIGS. 8A, 8B, and 8C are schematic sectional views of a spray particle adhering to an aluminum alloy substrate block, respectively.

The degree of crush of one of the adhering particles forming the sprayed coating on the block was examined, and the results are shown in FIG. 7. Note that the degree of crush is a ratio of a difference (a−b) between an adhering length (a) and an adhering height (b) per an adhering length (a) of the particle 12 adhered to the block (substrate) 11, as shown in FIG. 8A. At a low blow pressure, as shown in FIG. 8B, the degree of crush of an adhering particle 12 is small, but at a high blow pressure, as shown in FIG. 8C, the degree of crush is large. As seen from FIG. 7, the degree of crush of the adhering particle 12 becomes larger as the blow pressure is increased. When the molten particle impinges on the block 11 at a blow pressure of more than 11.2 kgf/cm$^2$, the degree of crush cannot be measured, since the bouncing of the particles is too great, the adhesion efficiency is low and the adhering particle is greatly deformed.

Figure 10:
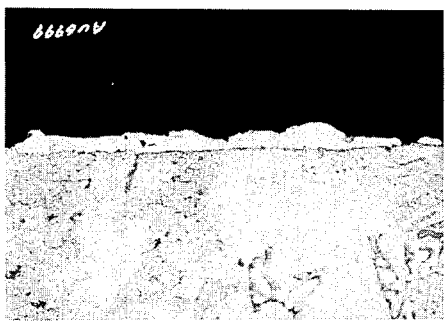
FIG. 10 is a microphotograph of Fe-C type spray particles adhering to an aluminum alloy substrate, under production conditions according to the present invention.
Figure 11:
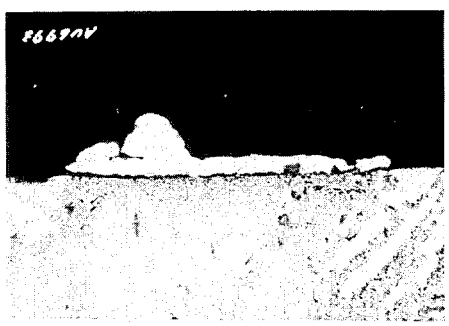
FIG. 11 is a microphotograph of Fe-C type spray particles adhering to the substrate, under comparative example conditions.

The blow pressure of 5.6 kgf/cm$^2$ (an example of the present invention) corresponds to a degree of crush of 0.95 of the adhering particle, as shown by the microphotograph (×400) of FIG. 10. The blow pressure of 2.8 kgf/cm$^2$ (a comparative example) corresponds to a degree of crush of 0.91 of the adhering particle, as shown by a microphotograph (×400) of FIG. 11.

Figure 9:
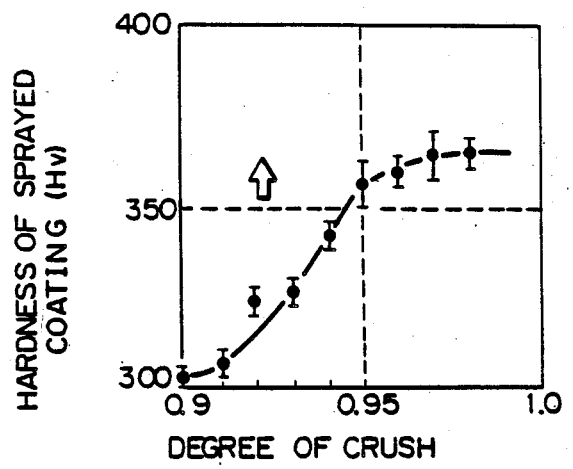
FIG. 9 is a graph showing a relationship between the degree of crush of spray particles and a sprayed coating hardness.

The hardness (Hv at 0.1 kg) of the sprayed coatings was then measured. The relationship between the hardness and the degree of crush of the sprayed particle is shown in FIG. 9. As seen from FIG. 9, as the degree of crush becomes greater, the hardness becomes higher. To obtain a hardness of the sprayed coating of from 350 to 450 Hv (explained in detail hereinafter) the degree of crush must be 0.95 or more.

EXPERIMENT B (Relationships Between Hardness of Sprayed Coating, and Spraying Electric Current and Abrasion Loss)

Figure 12:
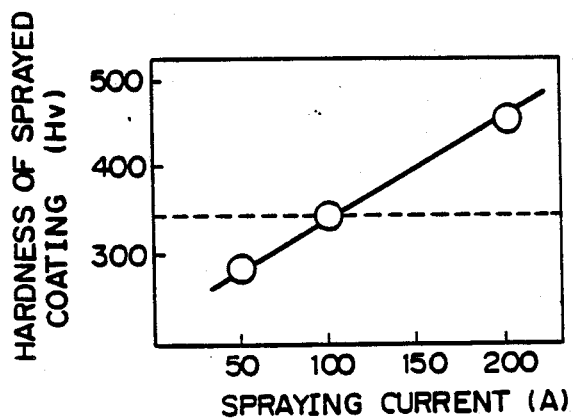
FIG. 12 is a graph showing a relationship of an electric current used in arc spraying and a sprayed coating hardness.
Figure 13:
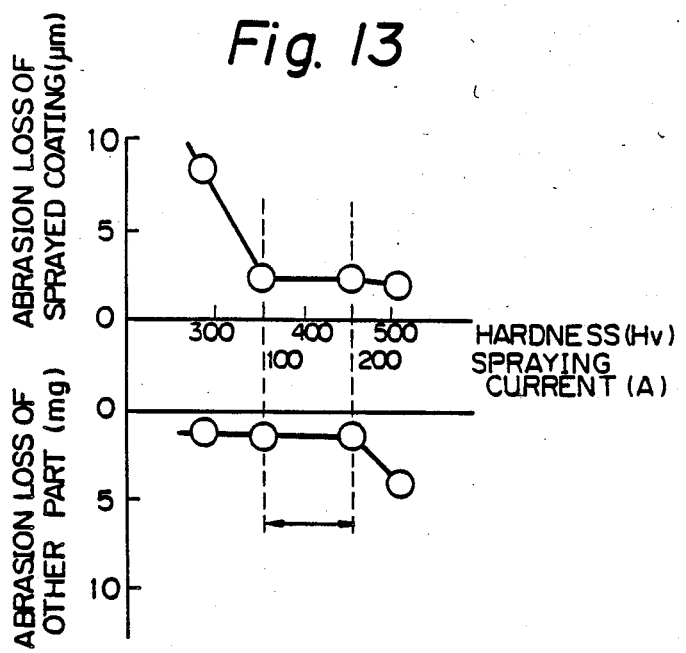
FIG. 13 is a graph showing relationships between a sprayed coating hardness (electric current for arc spraying) and abrasion losses of sprayed coating and of other parts.

Coatings were sprayed on shot-blasted surfaces of aluminum alloy blocks by electric arc spraying, under the following conditions.
Electric current for spraying: 50, 100 or 200 A
Blow pressure: 5.6 kgf/cm$^2$
Wire of sprayed material: Fe-0.8% C
Spraying voltage: 30 V
Spraying voltage: 150 mm The relationship between the hardness (Hv) of the sprayed coatings and the spraying current is shown in FIG. 12. As seen from FIG. 12, as the spraying current is increased, the hardness of the sprayed coating is increased. After the sprayed coating was ground, an LFW wear test was carried out, and the abrasion loss (wear depth, $\mu$m) of the sprayed coatings and the abrasion loss (removed weight, mg) of the other sliding parts of the aluminum alloy casting of AC2B were measured. The results are shown in FIG. 13. As seen from FIGS. 12 and 13, the sprayed coating having a hardness of less than 350 Hv (corresponding to a spraying current of less than 100 A) has an inferior wear resistance. At a sprayed coating hardness of more than 450 Hv (corresponding to a spraying current of more than 200 A), electric arcing is apt to occur and unmelted particles temporarily exist in the sprayed coating. These particles are hardened and become very hard, and thus cause wear of other sliding parts. Therefore, preferably the spraying current is from 100 to 200 A.

Furthermore, when the spraying current varies from 100 A to 200 A, the carbon content of the sprayed coating is increased from 0.27% to 0.36% (using a sprayed material wire containing 0.8% carbon). The carbon contained in the Fe-C sprayed coating has a hardening effect, and thus the increase of the carbon content raises the sprayed coating hardness proportionally. Since the electric current is correlated with the wire feed rate, the increase of the current accompanies an increase of the wire feed rate, whereby the molten particles are made large. Therefore, the sublimation and oxidation of some components in the large molten particles, caused by the arc, is smaller than in the small molten particles. Namely, there is less decrease of the carbon content, and therefore, the carbon content is increased as above-mentioned. The large molten particles have a large impingement energy, and thus are sufficiently crushed. Accordingly, the porosity of the sprayed coating is reduced and the hardness is raised. The carbon content has a stronger effect for raising the hardness than the spraying current.

EXPERIMENT C

Valve lifter bodies were formed from an aluminum alloy by cold forging, heat-treating and mechining to predetermined dimensions. The obtained lifter bodies were spray-coated by electric arc spraying, under the following conditions, to prepare samples A, B and C.

Sample A (Present Invention)

Wire of sprayed material: Fe-0.8% C
Spraying current: 100 A
Spraying voltage: 30 V
Blow pressure: 5.6 kgf/cm$^2$
Spraying distance: 150 mm

Sample B (Comparative Example)

The wire material spraying current, spraying voltage, and spraying distance were the same as in Sample A, but the blow pressure was 4.2 kgf/cm$^2$. The low blow pressure increased the porosity of the sprayed coating to 10%.

Sample C (Comparative Example)

The wire material, spray voltage, spraying distance, and blow pressure were the same as in Sample A, but the spraying current was 50 A. The low spraying current lowered and sprayed coating hardness to 280 Hv.

Sample D

The conditions were the same as in Sample A, except that the spraying current was 250 A. The high spraying current raised the sprayed coating hardness to 500 Hv.

The valve lifters of Samples A, B and C were ground, installed in an engine, and subjected to a durability test.

Figure 14:
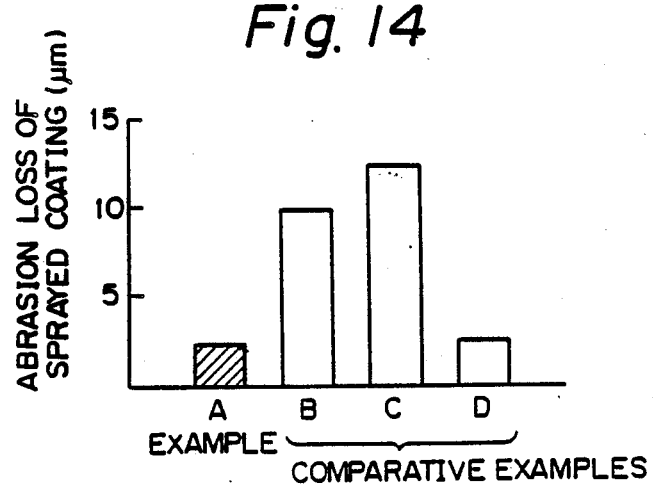
FIG. 14 is a graph showing a relationship between abrasion losses of sprayed coatings after durability tests in an engine, in which valve lifters having sprayed coatings are set.

The results of the durability test are shown in FIG. 14. As seen from FIG. 14, the abrasion loss of Samples B and C was large. In Sample B, the sprayed coating was cracked and had a poor peel resistance due to a high porosity. In Sample C, the sprayed coating had an inferior wear resistance due to the low hardness. Furthermore, in Sample D abnormal abrasion appeared on the inner surface of the guide hole, as the other sliding part, due to the high hardness of the valve lifter body.

Accpording to the present invention, an Fe-C type coating is sprayed by an electric arc spraying process at a blow pressure of from 5.6 to 11.2 kgf/cm$^2$ and a spraying current of from 100 to 200 A, so that the porosity of the sprayed coating becomes 5% or less and the degree of crush of the adhered particles is 0.95 or more, whereby the wear-resistance and peeling resistance of the sprayed coating are improved. Furthermore, the sprayed coating hardness of from 350 to 450 Hv provides a suitable wear resistance and reduces wear of other sliding parts by the sprayed coating.

EMBODIMENT 3

The third embodiment of the present invention will be described in further detail with reference to an example, comparative examples, and electric arc spraying process experiments.

EXAMPLE

Figure 15:
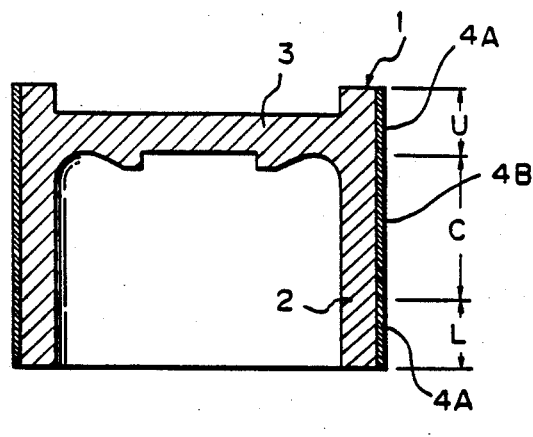
FIG. 15 is a schematic sectional view of an aluminum alloy valve lifter.

The valve lifter body 1 (see FIG. 15) was formed, by cold forging, from an aluminum alloy (for example, 11.6% Si, 4.1% Cu, 0.8% Mg, and the rest being Al and inevitable impurities), machined to a predetermined size, and subjected to a predetermined heat treatment.

Figure 16:
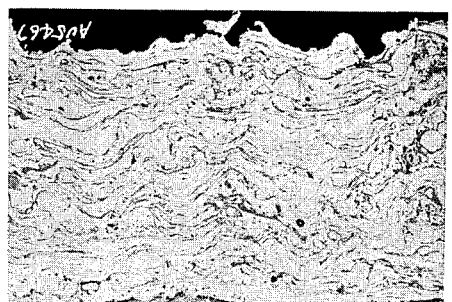
FIGS. 16 and 17 are microphotographs of Fe-C type sprayed coatings.

The central portion C (for example, 10 mm wide) of the cylindrical portion 2 of the valve lifter body 1 was masked, and then the surfaces of the upper end portion U (for example, 7 mm wide, from the upper end) of the cylindrical portion 2 and the lower end portion L (for example, 7 mm wide, from the lower end) were roughened by shot-blasting. After the mark was removed, electric arc spraying was carried out under the following conditions to form a first sprayed coating 4A (see FIG. 15):
Electric arc spraying apparatus: METCO 4R-Type
Spraying current: 200 A
Wire of sprayed material: Fe-0.8% C
Blow pressure: 9.8 kgf/cm$^2$ (140 psi)
Spraying distance: 150 mm
Sprayed coating thickness: 200 μm The first sprayed coating 4A had a hardness of Hv 450 and a porosity of 3%. A metallurgical micrograph (×200) of the thus formed first sprayed coating 4A is shown in FIG. 16.

Figure 17:
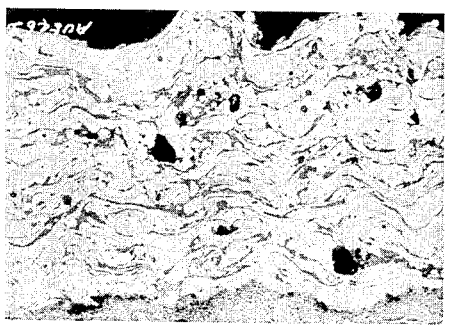

Next, only the sprayed coating portion on the central portion C was removed by shot-blasting and the surface of the central portion C of the cylindrical portion 2 was roughened by shot-blasting. Thereafter, the same electric arc spraying apparatus (METCO 4R-Type) and the wire of sprayed material (Fe-0.8% C) were used to form a second sprayed coating 4B on the central portion C under the following conditions:
Spraying current: 100 A
Blow pressure: 4.2 kgf/cm$^2$ (60 psi)
Spraying distance: 150 mm
Spraying coating thickness: 200 μm The second sprayed coating 4B had a hardness of Hv 350 and a porosity of 8%. A metallurgical micrograph (×200) of the thus formed second sprayed coating 4B is shown in FIG. 17.

Then, the first and second sprayed coatings 4A and 4B were ground to a thickness of 50 μm by a centerless grinding process, to thereby produce the required aluminum alloy valve lifter having a sprayed coating.

The thus produced valve lifter was installed in an engine to evaluate the durability of the valve lifter in a continuous high-speed running test. In the test, the engine was driven at a speed of 4,000 rpm for 60 hours, a speed of 5,000 rpm for 60 hours and a speed of 6,000 rpm for 60 hours (i.e., continuously for 180 hours). As lubrication for the valve lifter, oil (7.5 w-30) was used. The abrasion losses (depth) at the upper and lower end portions of the valve lifter were 1.2 μm as shown in FIG. 18.

COMPARATIVE EXAMPLE 1

The entire wear resistance portion of a valve lifter body fabricated in the same manner as in the example was surface-roughened by shot-blasting. A sprayed coating was formed on the whole peripheral surface using the same electric arc spraying apparatus (METCO 4R-type) and the same wire of sprayed material (Fe-0.8% C) as in the Example, under the following conditions:
Spraying current: 200 A Blow pressure: 9.8 kgf/cm$^2$
Spraying distance: 150 mm
Sprayed coating thickness: 200 μm The formed sprayed coating corresponded to the first sprayed coating in the example, except that the first sprayed coating was formed on the whole peripheral surface of the cylindrical portion.

Figure 18:
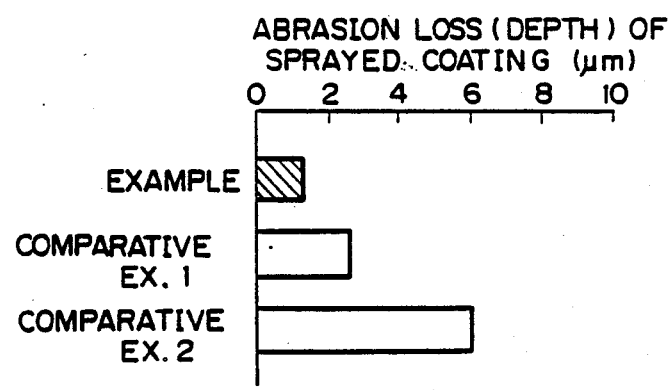
FIG. 18 is a graph showing a relationship between abrasion losses of sprayed coatings after durability tests in an engine.

After applying a centerless grinding process due to the sprayed coating, the valve lifter was subjected to the same continuous high-speed running test as in the Example to determine the abrasion loss (depth) of the sprayed coating, which was 2.5 μm as shown in FIG. 18.

COMPARATIVE EXAMPLE 2:

The entire cylindrical portion of a valve lifter body fabricated in the same manner as in the example was surface-roughened by shot-blasting. A sprayed coating was formed on the whole peripheral surface using the same electric arc spraying apparatus (METCO 4R) and the same wire of sprayed material (Fe-0.8% C) as in the Example, under the following conditions:
Spraying current: 100 A
Blow pressure: 4.2 kgf/cm$^2$
Spraying distance: 150 mm
Sprayed coating thickness: 200 μm The formed sprayed coating corresponded to the second sprayed coating in the Example, except that the second sprayed coating was formed on the whole peripheral surface of the cylindrical portion.

After applying a centerless grinding process to the sprayed coating, the valve lifter was subjected to a same continuous high-speed running test as in the Example to determine the abrasion loss (depth) of the sprayed coating, which was 6.0 μm as shown in FIG. 18.

As seen from FIG. 18, the aluminum alloy valve lifter with the sprayed coating according to the present invention shows a small abrasion loss compared with comparative examples 1 and 2. In comparative example 2, the abrasion loss is large since the hardness of the sprayed coating is low. The sprayed coating in the comparative example 1 is the same as the first sprayed coating of the valve lifter according to the present invention, but the abrasion loss of the sprayed coating in comparative example 1 is larger than in the present invention. The second sprayed coating formed on the central portion of the valve lifter has pores serving as oil traps for supplying lubricating oil to the sliding surface.

The first sprayed coating of the above-mentioned example and the sprayed coating in the comparative example 1 may be formed by plasma spraying. In this case, the property of the sprayed coating is smaller than in the electric arc spraying and can be made 2%.

According to the present invention, the Fe-C type sprayed coating can be formed on the peripheral surface of the aluminum alloy valve lifter so as to present different characteristics on the central portion, upper end portion, and lower end portion, respectively, of the valve lifter. Namely, it is possible to improve the wear resistance of the valve lifter as a whole by forming an appropriately hard, wear-resistant sprayed coating on the upper and lower end portions of the valve lifter, where the abrasion due to sliding is large, and a porous, oil-impregnable sprayed coating on the central portion of the valve lifter.

EMBODIMENT 4

Figure 19:
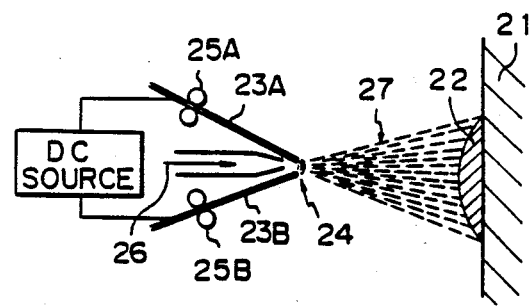
FIG. 19 is a schematic view of an electric arc spraying apparatus and sprayed coating, for explaining the spraying process.
Figure 20:
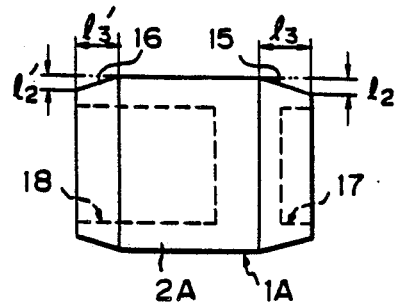
FIG. 20 is a front view of an aluminum valve lifter body without a sprayed coating.
Figure 21:
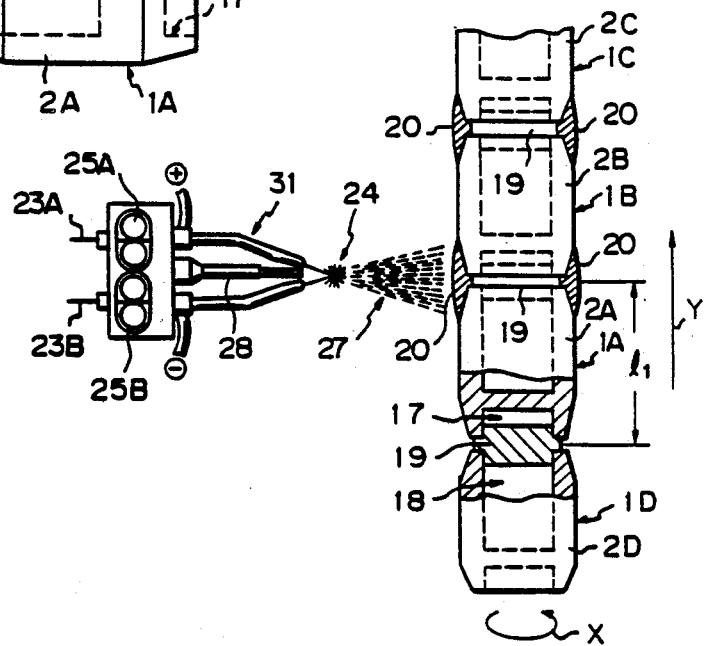
FIG. 21 is a schematic view of an electric arc spraying apparatus and valve lifter bodies, during the arc spraying process.

The fourth embodiment of the present invention will be further described in detail by an electric arc spraying process and an example of the present invention with reference to FIGS. 19, 20, and 21.

First, when a wear-resistant sprayed coating of Fe-C or the like is formed on a substrate 21, as shown in FIG. 19, the wear-resistant material is deposited thickly at its central portion and deposited less thickly at a distance from the central portion, thereby forming a sprayed coating 22. The spraying apparatus shown in FIG. 19 is for metal arc spraying use. An electric arc 24 is generated between wires 23A and 23B of a predetermined composition metal to melt the end portion of the wires. While the wires are melting, they are fed by wire feeding rollers 25a and 25B, and a compressed air or inert gas 26 is blown from the back of the arc 24 to blow the molten particles (droplets of Fe-C or the like) 27 toward the substrate 21. The spray particles are thus sprayed and coated on the substrate 21. A similar sprayed coating also can be formed by a plasma spraying process using a powder material.

EXAMPLE

A valve lifter body 1A is shown in FIG. 20 is fabricated by die casting or forging aluminum alloy and by machining same. As described above since the peripheral surface abrasion on the cylindrical portion 2A of the valve lifter body 1A is about 5 to 7 mm wide from the upper and lower ends, respectively, and becomes smaller toward the central position, the portions 15 and 16 corresponding to the width are tapered. The dimensions of the taper portion 15 at the upper end (taper portion 16 at the lower end) are, for example, $l_2 (l_2')=30$ μm (radical length) and $l_3 (l_3')=5$ mm (longitudinal length). These lengths $l_2$ and $l_3$ are set as follows:
Radical length $l_2 (l_2')$:

Where the requirement for the wear resistance of the sprayed coating is that the wear depth should be less than 30 μm after a predetermined time has passed in a durability test with the test valve lifter installed in an engine, the radial length is made 30 μm.
Longitudinal length $l_3 (l_3')$:

This is the length of the abraded area on the peripheral surface of the valve lifter from the upper (lower) end thereof, and is made about 5 to 7 mm, depending upon the width of the sliding portion of the valve lifter in the cylinder head guide hole as the valve lifter inclines while the engine in which the valve lifter is installed is running.

The valve lifter body 1A has a recess 17 formed at the upper end portion thereof in which an adjusting shim (not shown), which is in contact with a cam, can be fitted; and at the lower end portion thereof, a cavity 18 is formed to receive the end portion of a valve rod (not shown).

A plurality of valve lifter bodies 1A to 1D fabricated as above are stacked one on the other with a spacer plate 19 inserted between two successive valve lifter bodies, as shown in FIG. 21. The spacer plate 19 is disposed between the upper end of the lower valve lifter body 1A and the lower end of the lower valve lifter body 1D, and has convex portions which are fitted in the recess 17 and cavity 18, respectively, as shown, to prevent displacement when the valve lifter bodies are stacked.

The connecting position of the valve lifter bodies where the spacer plate 19 is disposed is set in front of the spraying apparatus 31. The entire valve lifter body assembly is rotated about the center axis thereof (in the direction of arrow X), and an abrasion-resistant material (for example, Fe-C) is thermally sprayed over the upper taper portion of the valve lifter body 1B and the lower taper portion of the valve lifter body 1A, to thereby form a sprayed coating 20. The thickness profile of the sprayed coating shows a maximum thickness at the central portion thereof, as described with reference to FIG. 19. By appropriately setting the diameter and thickness of the spacer plate 19, the sprayed coating thickness on the upper end of the valve lifter body 1B (and lower end of 1A) can be maximized. Toward the central portions of the central portions, respectively, of the valve lifter bodies 2B and 2A, the sprayed coating thickness becomes smaller, and thus a sprayed coating corresponding to the wear pattern can be formed on the taper portions. Namely, the thickness of the sprayed coating is $l_2$ ($l_2'$), as shown in FIG. 20, or slightly more at the upper and lower ends of the valve lifter body.

The spraying apparatus 31 shown in FIG. 21 is identical to the metal arc spraying apparatus shown in FIG. 19. Wires 23A and 23B are fed by wire feeding rollers 25A and 25B, are melted by an arc 24, and the molten particles 27 are sprayed with a compressed air from a tube 28 toward the point at which the valve lifter bodies are connected.

After a sprayed layer 20 is formed, the entire set of valve lifter bodies is advanced a distance $l_1$ (a length of the valve lifter body and a thickness of the spacer plate) in the direction of arrow Y. As described above, thermal spraying is carried out on the upper taper portion of the valve lifter body 1A and lower taper portion of the valve lifter body 1D, and by repeating this process, the thermal spraying can be continually carried out.

Then, to separate the set of the valve lifter bodies into individual valve lifter bodies 1A to 1D, the sprayed coating corresponding to the spacer plate 19 is cut, and finally, each of the valve lifter bodies 1A to 1D, thus separated, is finished by grinding the peripheral surface including the sprayed coating, to provide a complete aluminum alloy valve lifter. The obtained valve lifter has the sprayed coating only at the areas of the upper and lower ends thereof where wear occurs due to the sliding of the valve lifter.

According to the present invention, the sprayed coating is regionally formed in a width of about 5 to 7 mm from the upper and lower ends of the aluminum alloy valve lifter, and therefore the material cost of the sprayed coating formed according to the present invention is about ¼ to 1/6 that needed for the conventional sprayed coating having a uniform thickness.

For the conventional thermal spraying on the whole peripheral surface of the valve lifter, the valve lifter body or spraying apparatus must be continuously or eventually reciprocally moved longitudinally of the valve lifter. According to the present invention, however, the valve lifter body need be only moved stepwisely over a prescribed distance. Also, the present invention needs a smaller spray amount, and thus the finishing is correspondingly easier. Further, the thermal spraying can be continually applied to the valve lifter bodies while stacked one upon the other. Accordingly, the valve lifter of the present invention can be produced at a lower cost than the conventional alluminum alloy valve lifters.

EMBODIMENT 5

Figure 22:
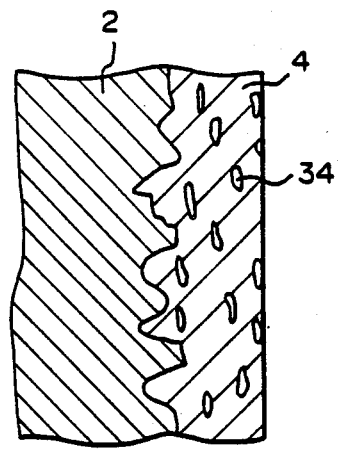
FIG. 22 is a partly enlarged sectional view of an aluminum alloy valve lifter body with a sprayed coating.
Figure 23:
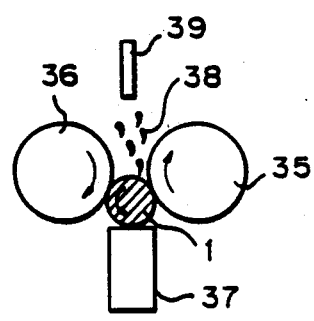
FIG. 23 is a schematic view of a rotation device for removing water from a valve lifter body; and, FIG. 24 is a schematic view of a vacuum heating device for removing water from a valve lifter body.
Figure 24:
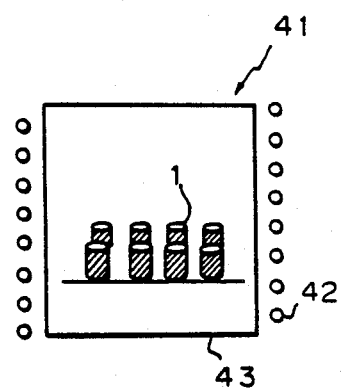

The fifth embodiment of the present invention will be further described in detail by examples 1 and 2 and experiments A and B with reference to FIGS. 22 to 24.

EXAMPLE 1

(With High-Speed Rotation)

A valve lifter body 1 is formed from an aluminum alloy (for example, 11.6% Si, 4.1% Cu, 0.8% Mg, and the rest being Al and inevitable impurities) by cold forging, machined to predetermined dimensions as shown in FIG. 1, and heat-treated. A wear-resistant chip 5 (for example, a hardened alloy steel) is placed and fixed inside a disk portion 3 of the valve lifter 1, and an Fe-C type sprayed coating 4 (for example, Fe-0.8% C) is then formed by electric arc spraying on the peripheral surface of the cylindrical portion 2 of the valve lifter 1. At this time, the sprayed coating 4 has pores 34 therein, as shown in FIG. 22.

The valve lifter 1 is subjected to a conventional centerless grinding process using a water-soluble oil, to finish the periphery of the cylindrical portion 2 of the valve lifter 1 to predetermined dimensions (diameter).

Next, as shown in FIG. 23, the peripheral-ground valve lifter 1 is placed on a work rest 37 between two adjusting rollers 35 and 36 having a similar structure, as in a conventional centerless grinder, and rotated at a speed of more than 500 rpm (for example, 550 rpm) while driven by the adjusting roller 35. This rotation centrifugally blows away the water 38 from pores 34 in the sprayed coating 4, so that the pressure in the pores 34 is temporarily negative (lower than the atmospheric pressure). Then, just before the rotation is stopped, a rust preventive oil is sprayed through a spray nozzle 39 (FIG. 23) onto the valve lifter 1 and penetrated into the pores 34, and thus a sample A of the aluminum alloy valve lifter is produced.

EXAMPLE 2

(With Vacuum Heating)

A valve lifter fabricated under the same conditions as in example 1, up to the process of centerless grinding, is put into a vacuum heater 41 shown in FIG. 24 to remove water from the pores in the sprayed coating. The vacuum heater 41 comprises a heating vacuum chamber 43 with a heating means 42 and is connected to an exhaust system such as a vacuum pump. The heating means 42 includes a resistance heater, infrared lamp or the like. In this case, a resistance heating coil 42 is wound onto a metallic vacuum chamber 43. After a plurality of valve lifters 1 are put in the vacuum heater 41, the chamber is vacuumized to a pressure of $10^{-2}$ to $10^{-3}$ Torr (for example, $5 \times 10^{-3}$ Torr) and the valve lifters 1 are heated at a temperature of 80 to 150° C. (for example, about 100° C.) to remove water by evaporation without oxidation of the Fe-C type sprayed coating. After the water removal, the valve lifters 1 are taken out of the vacuum heater 41, and immediately dipped in the rust preventive oil bath to penetrate the oil into the pores in the sprayed coating, and thus a sample B of the aluminum alloy valve lifter is produced.

As comparative samples, first a valve lifter fabricated under the same conditions in example 1, up to the process of centerless grinding, is taken as a sample C (with water remaining in the pores in the sprayed coating and the rust preventive oil not applied). Second, a valve lifter fabricated under the same conditions as in example 1, up to the process of centerless grinding, is dipped in the rust preventive oil and is taken as a sample D.

EXPERIMENT A

The samples A to D valve lifter were subjected to an outdoor weather exposure test (in an industrial zone), and noticeable differences between the samples were found on the third day after the test was started. Namely, the samples A and B of the valve lifters produced according to the present invention showed no abnormality; spot corrosions were found on the comparative sample D; and the sample C had about twice as many spot corrosions as sample D. After thirty days (on the thirtieth day), sample C was found to be rusty (oxidation of the iron) all over the surface thereof, and the sample D was rusty over about half of the surface area thereof. Examination of the section of these rusty portions revealed a heavy rust (erosion) particularly around the pores in the sprayed coating and surface concavities of the coating.

The results of this experiment prove that it is extremely important to remove water from the pores in the sprayed coating on the valve lifter, and that the present invention can very effectively remove water from such pores.

EXAMPLE B

The above-mentioned samples A to D of valve lifter were installed in engines, respectively, and the engines were subjected to a scuffing test at a low speed of 600 to 1,000 rpm for 2,000 hours. Engine disassembling was performed every 50 hours. The results of the experiments revealed that a seizure was about to take place between the valve lifter and the cylinder head hole in the sample C within a time of 50 hours. Also, a same seizure was found regionally in the sample D at a time of 2,000 hours. On the contrary, no abnormality was found in the samples of valve lifter according to the present invention, even after a lapse of 2,000 hours.

The results of the experiments prove that the oil (rust-preventive oil) in the pores in the sprayed coating acts as a lubricant when the valve lifter slides at a low speed such that the oil will not be sufficiently circulated, namely, the sprayed coating serves as an auxiliary lubricant.

In the above-mentioned examples 1 and 2 and comparative examples, the sprayed coating is formed by electric arc spraying, but may be formed by plasma spraying instead. In the latter case, the pores are smaller in number than with the electric arc spraying, but water must be removed from the pores.

According to the present invention, water is removed from the pores in the Fe-C type sprayed coating on the aluminum alloy valve lifter and an oil is penetrated into the pores, so that the oil effectively prevents rusting of the valve lifter and effectively counters the initial scuffing during running of the engine in which the valve lifter is installed. Also the oil contributes to the formation of an oil film between the valve lifter and guide hole, thereby permitting a low frictional coefficient to be maintained. Thus, the valve lifter is less worn on the peripheral surface thereof, and the guide hole is also less worn.

It will be obvious that the present invention is not restricted to the above-mentioned embodiments and that many variations are possible for persons skilled in the art without departing from the scope of the invention. For example, by applying a sub-zero treatment in which the sprayed coating is cooled to less than 0° C. immediately after the thermal spraying, the residual austenite in the Fe-C type sprayed coating can be changed to a martensite, to improve the hardness of the sprayed coating, thereby improving the wear resistance of the sprayed coating.

We claim:

1. An aluminum alloy valve lifter having a sprayed coating comprising:
   a valve lifter body of an aluminum alloy essentially consisting of 5 to 20% Silicon, an additive element for increasingt strength, aluminum and inevitable impurities, and holding silicon particles having an average grain diameter of from 2 to 40 micrometers in the matrix thereof;
   an Fe-C type sprayed coating formed on a sliding peripheral surface of said valve lifter body having a carbon content of 0.1% or more and a hardness of 300 Hv or more;
   a wear-resistant chip fixed on a portion of the valve lifter body for contact with a valve rod; and
   an adjusting shim set on another portion of the body for contact with a cam.

2. An aluminum alloy valve lifter according to claim 1, wherein said additive element is at least one selected from the group consisting of Mg, Cu and Ni.

3. An aluminum alloy valve lifter according to claim 1, wherein said Fe-C type sprayed coating is formed by electric arc spraying and has a porosity of 5% or less, each of the spray particles of said sprayed coating having a degree of crush upon adhesion (adhesion length a—adhesion height b/adhesion length a) of 0.95 or more.

4. An aluminum alloy valve lifter according to claim 1, wherein said Fe-C type sprayed coating consists of an upper portion and a lower portion having a hardness of from 350 to 450 Hv, and a center portion having a porosity of from 5 to 10%.

* * * * *